UNITED STATES PATENT OFFICE.

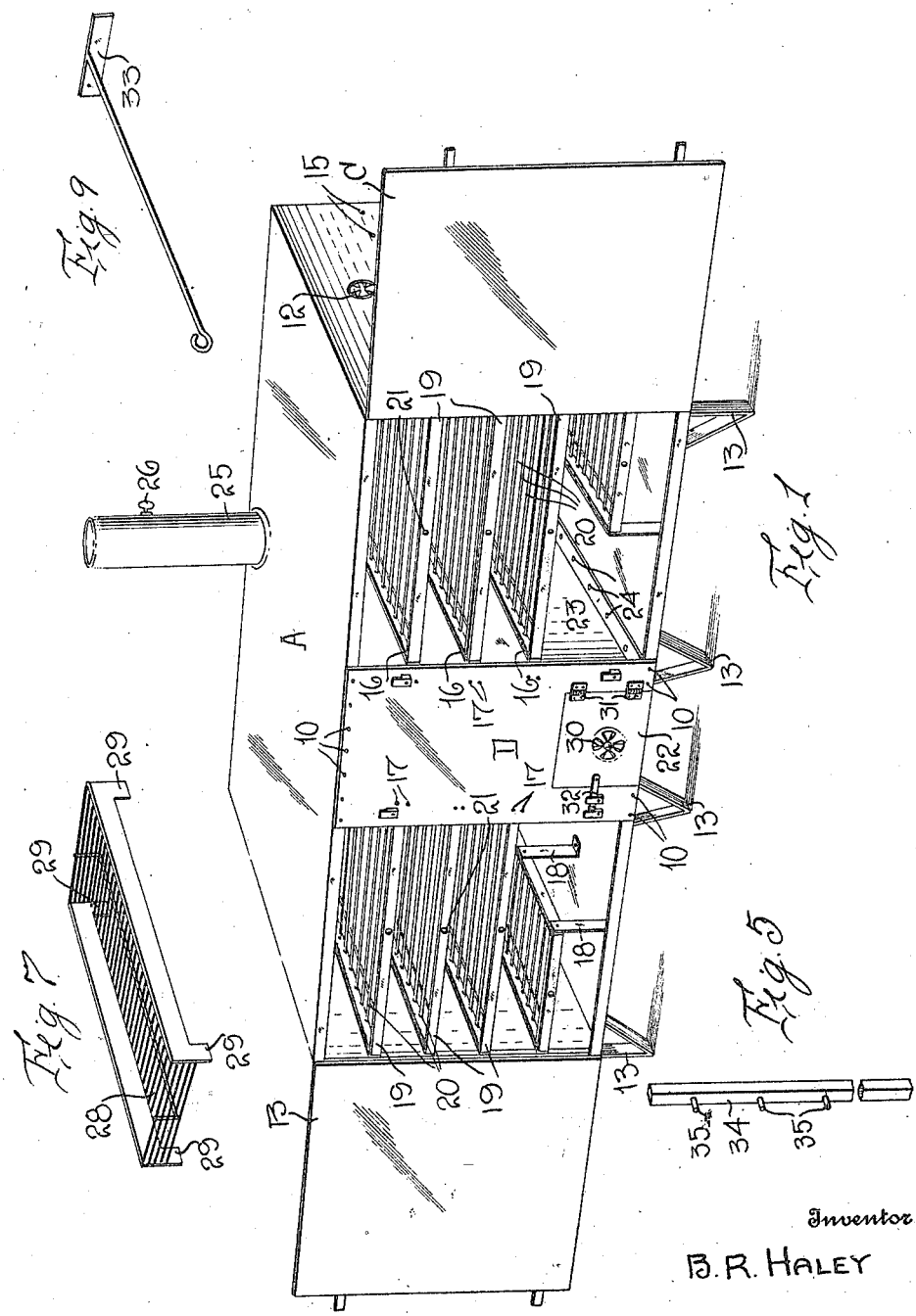

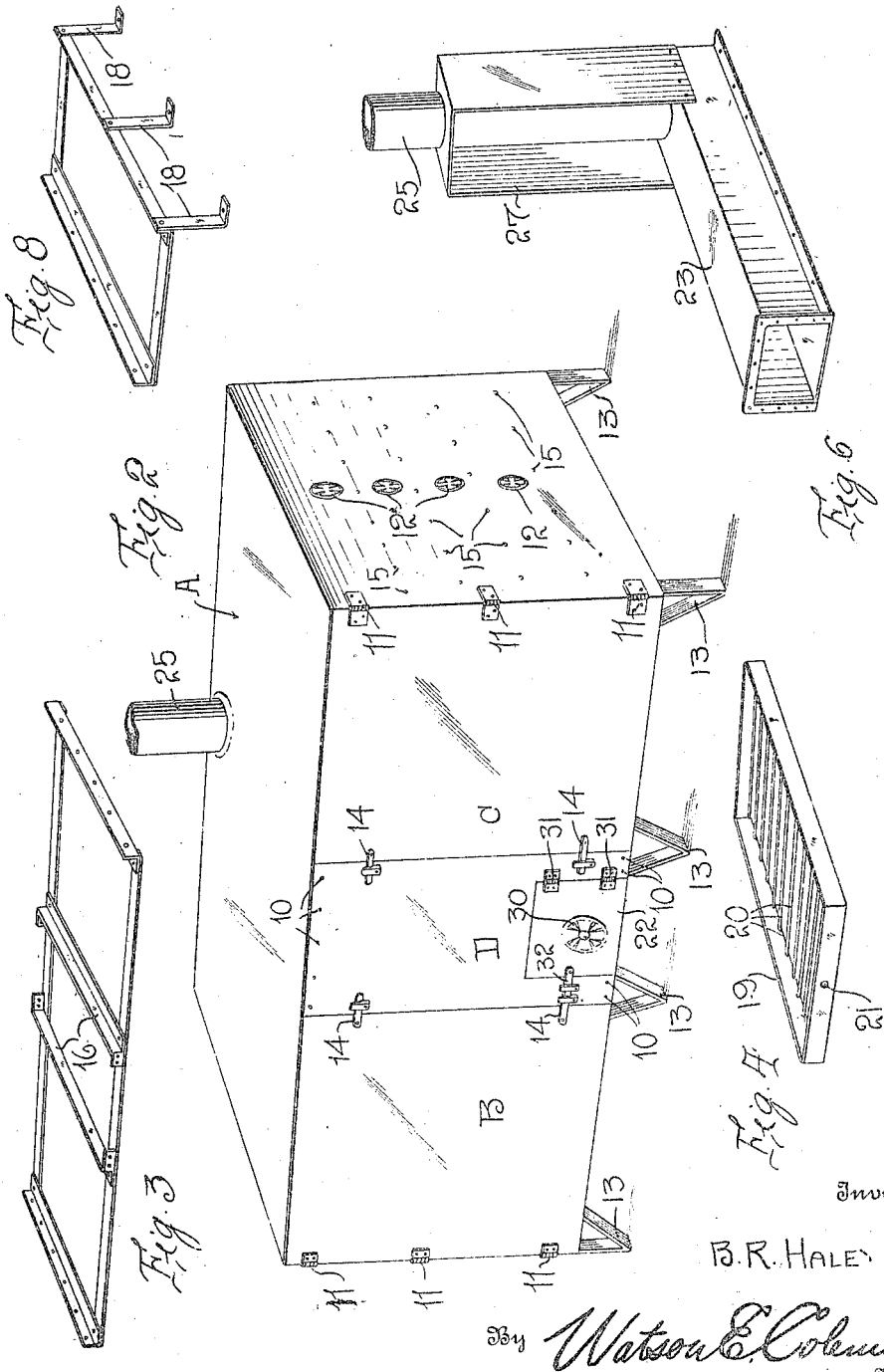

BERTHA R. HALEY, OF WELLSTON, OKLAHOMA.

FRUIT-DRIER.

1,216,442.

Specification of Letters Patent.  Patented Feb. 20, 1917.

Application filed May 17, 1916. Serial No. 98,173.

*To all whom it may concern:*

Be it known that I, BERTHA R. HALEY, a citizen of the United States, residing at Wellston, in the county of Lincoln and State of Oklahoma, have invented certain new and useful Improvements in Fruit-Driers, of which the following is a specification, reference being had to the accompanying drawings.

This invention is a fruit drier more particularly adapted for domestic use in the evaporation of fruits, by which relatively small quantities of fruit may be dried.

One object of this invention is to provide a compact, useful and economical evaporator that may be readily and easily operated in domestic service.

Another object is to provide an evaporator that will consist of few parts, the trays of which are removable and one that may be easily kept clean.

A further object is to provide an evaporator in which the oven portion may be cooled by means of spaced ventilators positioned upon the ends.

A still further object is to provide an evaporator with a relatively small furnace which extends transversely of the oven at the lower portion thereof and thus permits the heat to radiate from the sides of the jacket to readily pass through the different frames positioned in the oven.

Broadly stated, the invention comprises a casing including doors, ventilators, a furnace including a removable grate, a door for the furnace including a draft opening, a flue for the furnace, braces for the casing, a plurality of frames secured to the casing above the furnace and extending over the same, removable fruit trays adapted to be positioned on the frames and latches for the several doors.

One practical form of construction will be described and illustrated in the accompanying drawings, in which, Figure 1 is a perspective view of the interior of the oven with the doors open;

Fig. 2 is a perspective view showing the doors closed;

Fig. 3 is a perspective view of one of the frames;

Fig. 4 is a perspective view of one of the fruit carrying trays;

Fig. 5 is a perspective view showing one of the supporting members to be used in conjunction with the fruit carrying trays;

Fig. 6 is a perspective view of the furnace;

Fig. 7 is a perspective view of the removable frame;

Fig. 8 is a perspective view of one of the carrier frames;

Fig. 9 is a perspective view of a scraper.

This fruit drier is preferably rectangular in shape and comprises a casing A which may be formed of any suitable material such as galvanized iron. This casing A is provided with doors B and C upon one side thereof. These doors may also be formed of like material or substance which composes the casing. Vertically disposed upon the same side as the doors B and C is a plate D which extends from the top to the bottom of the oven or casing. This plate may be secured in any suitable way, one being by the rivets 10.

The doors B and C may be secured to the ends of the casing A, as shown by the hinges 11. These hinges may be of any preferred form. This casing A may be provided at its ends with suitable draft openings, indicated at 12. These openings may be covered with a screen. To support the casing A in a suitable manner above the ground, the legs 13 may be employed. These may be formed of any convenient material and of any suitable shape, one shape or form being shown in Fig. 1. The doors B and C may be provided with suitable catches or latch members indicated at 14 to coöperate with engaging members secured to the section D. One form of means is that shown, of a pivoted member coöperating with a curved member disposed on the plate D.

Disposed within the casing A are suitable frames which are spaced apart vertically. Three of these frames are shown, which extend the entire length of the oven or casing A. These frames have suitable ends formed thereon which may be secured to the ends of the casing A by means of the rivets indicated at 15. Intermediate of the ends of the frame and transversely thereof are suitable angle members 16 which are adapted to be secured to the back wall of the oven and to the plate D upon the front by means of the rivets indicated at 17. By riveting these frames to the ends of the casing and through the angle members 16 to the plate D and the back wall, a very rigid construction is had.

Disposed at the lower portion of the casing or oven A are two shorter frames, as shown in Figs. 1 and 8. These frames are supported at one edge by means of the vertical legs 18. The other edge of this frame is secured to the end wall in a manner similar to the other trays by means of the rivets 15. This formation of the two shelves at the lower portion of less longitudinal length, provides a space on each side of the furnace.

The fruit trays indicated at 19 are preferably of rectangular shape so that they will easily slide on to the frames between the ends thereof and the angle portion 16. These fruit trays are provided with slats indicated at 20. These trays may be made of wood and bound with iron to hold them more secure against warping. One end of these trays is provided with a suitable aperture 21 to engage with a pin.

At the lower portion of the plate D there is a door 22 which communicates with the jacket or the furnace 23. This furnace is secured to the bottom of the casing A in any suitable manner, one of which is indicated by the rivets 24. The ends of this furnace are also secured in a like manner to the plate D and to the back wall of the casing A. Adjacent the back end of the jacket 23 there is positioned the smoke pipe or flue 25. This smoke pipe, after passing out through the upper or top portion of the casing A may be provided with a suitable damper 26. To protect the trays from the heat of the smoke pipe, a suitable casing 27 is provided, as shown in Fig. 6, said casing being substantially in the form of an inverted U and having its arms suitably connected to the sides of the jacket 23, while the pipe or flue 25 is disposed through the intermediate or base portion of said frame.

In order to provide or keep a fire within the furnace or jacket 23, a suitable grate 28 is provided. This grate is provided with the legs 29 to raise it from the bottom of the casing A. This allows a space for the ashes to drop down. This grate is removable through the door 22. The door 22 is provided with a draft opening 30 of any convenient form or type. The door may be secured to the plate D by means of the usual or customary hinges shown at 31. The door may be kept in a closed condition by means of the latch indicated at 32. To provide for cleaning dirt and ashes or refuse from the oven and from the furnace, a suitable scraper 33 is provided, as shown in Fig. 9.

When the fruit trays are pulled out for inspection, some means must be employed to hold the front edges and to do this a supporting member 34 is provided. This member 34 has inserted upon one face a plurality of pins 35 which are spaced a suitable distance apart to engage with the apertures or sockets 21 formed in the ends of the trays 19. This will provide a convenient and ready means for supporting the ends of the trays when they are drawn out to inspect the fruit in the process of drying.

In practical operation, a fire is built in the grate 28 and the intensity of it is regulated by means of the draft opening 30. The fruit trays are positioned upon the frames and the doors B and C are closed. The fruit is then dried in a satisfactory manner by means of the radiation of the heat and by convection currents of air. Should the heat become too great, the ventilators 12 in the ends of the casing A may be opened to produce a more rapid ventilation to permit the heat to pass out more quickly.

Minor changes in the form and details of construction may be resorted to without departing from the spirit of my invention or the scope of the appended claims.

Having described this invention, what is claimed is:—

1. A fruit drier comprising a casing provided with doors and ventilators, a furnace including a jacket positioned within the casing, removable trays positioned at opposite sides of the furnace, a flue in communication with the furnace, and a casing substantially in the form of an inverted U secured to the furnace at opposite sides of the flue, said flue passing through the intermediate portion of the casing, said last named casing serving as a means to protect the contents of the trays from the heat of the flue.

2. A fruit drier comprising a rectangular casing including doors positioned upon one side, a plurality of ventilators in each end of the casing, a plurality of frames secured to the casing, removable fruit trays adapted to be positioned on the frames, a furnace including a jacket and provided with a removable grate, a flue for the furnace, and means to protect the contents of the trays from the heat of the flue.

In testimony whereof I hereunto affix my signature in the presence of two witnesses.

Mrs. BERTHA R. HALEY.

Witnesses:
W. H. HOLLIS,
D. F. CRIST.